United States Patent Office 3,785,924
Patented Jan. 15, 1974

3,785,924
NUCLEAR REACTOR CORE SHROUD
Gennaro V. Notari, Simsbury, Conn., assignor to Combustion Engineering, Inc., Windsor, Conn.
Filed Sept. 2, 1970, Ser. No. 68,878
Int. Cl. G21c 19/28
U.S. Cl. 176—61　　　　　　　　　　　　　　　10 Claims

ABSTRACT OF THE DISCLOSURE

A core shroud comprised of a plurality of vertically stacked cylindrical thermal shields resting on a core support plate. Horizontal plates closely conforming to the core shape are sandwiched between each thermal shield. The inner thermal shield sections have vertical plates in the form of angles welded to the interior in a manner generally conforming to the periphery of the core. An outer thermal shield surrounds each of the inner thermal shields. Vertical tie bolts located in the annular space between the two shields maintain a resiliently compressive force on the stacked array of thermal shields and horizontal plates. A core support barrel surrounds the shield and the structure has openings to permit downward flow of some of the coolant through the various annular spaces formed by the shields prior to passage of coolant through the core.

BACKGROUND OF THE INVENTION

My invention is related to nuclear reactors and in particular to a construction of a nuclear reactor core shroud. U.S. patent application of Robert C. Marshall, Ser. No. 788,709 filed Jan. 3, 1969, now U.S. Pat No. 3,607,637, illustrates a core shroud arrangement wherein horizontal plates are used to restrict coolant flow to the core area of a nuclear reactor. My invention relates to a particular construction for a core shroud of that type.

While the tolerances with that type of a core shroud are less critical with conventional core shrouds, certain reasonable tolerances must still be maintained. Welding distortion makes it difficult to maintain tolerances required without substantial machining after welding and extensive care in welding each of the components.

SUMMARY OF THE INVENTION

Horizontal sealing plates used to restrict coolant flow to the core area are sandwiched between generally cylindrical thermal shields. The horizontal plates are machined on the edges adjacent the core for the close tolerances desired for performance of the flow limiting function. The radial dimension of the thermal shields supporting these plates is substantially less critical so that welding and any other operation can be performed on these shields without the distortion interfering with the radial tolerances. The horizontal plates are not strength welded to the shields and, therefore, there is no distortion interposed on the required close tolerance construction. These horizontal plates may also be easily adjusted during erection of the structure.

Vertical plates are welded to the interior of the thermal shields to increase the strength of the shield and also to improve the hydraulic functioning of the horizontal plates. Close tolerances need not be maintained in the radial direction so that fabrication may be readily effected without excessive time consuming concern with quality control and rework.

The overall height tolerance is maintained by accurately machining the top and bottom of each segment only, along with the vertical plates if desired. The surface of the horizontal plates can also be machined where it is in contact with the thermal shields. This machining can be done after the vertical plates are welded in place. This provides an inexpensive simple manner of maintaining the overall height tolerances of the structure without expensive machining operations.

A core barrel supported at its upper end in turn supports the core and thermal shields from its lower end. Coolant flow openings through the upper portions of the core barrel permits flow between the various thermal shields for cooling of these shields without the coolant bypassing the core.

DESCRIPTION OF THE PREFERRED EMBODIMENT

Figure 1:
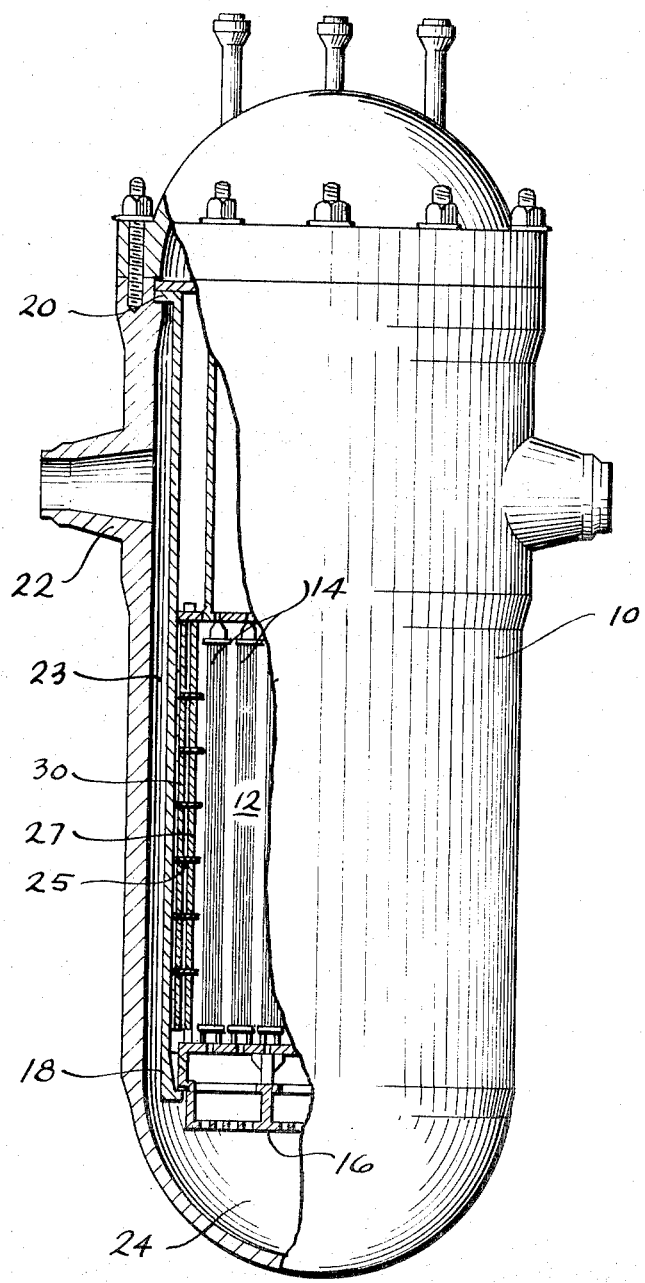
FIG. 1 is a partial side elevation of a nuclear reactor.
Figure 2:
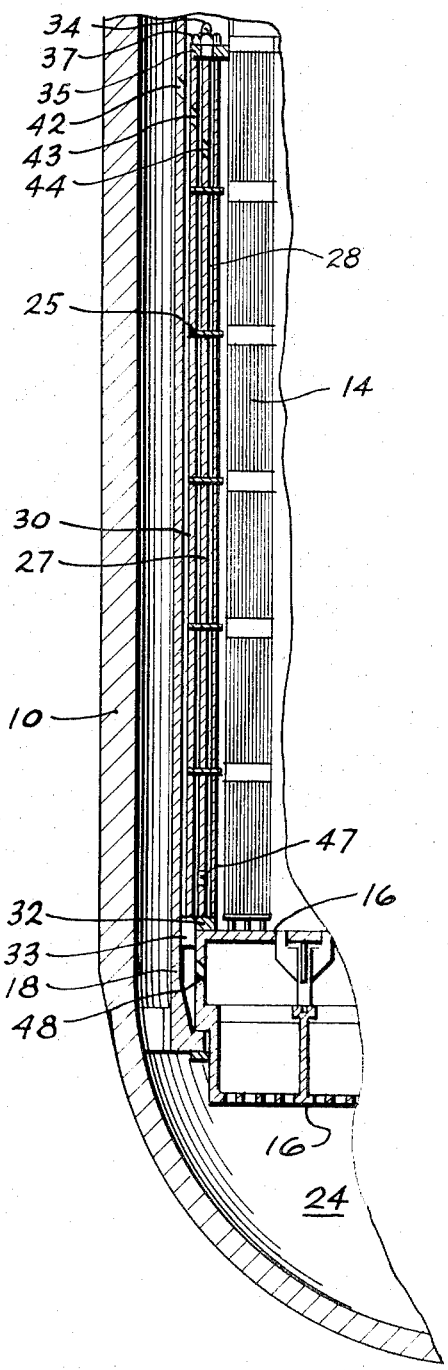
FIG. 2 is a sectional elevation view showing the shroud structure.
Figure 3:
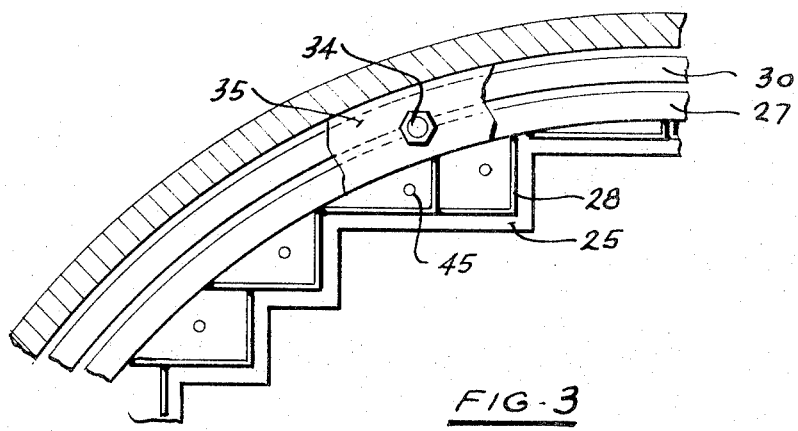
FIG. 3 is a sectional plan view through a portion of the shroud structure.

Reactor pressure vessel 10 includes a core 12 having a plurality of fuel assemblies 14. The core is supported from the core support plate 16 which is in turn supported from the lower end of the core support barrel 18. The core support barrel is supported at its upper end by flange 20.

Coolant passes into the pressure vessel through inlet nozzle 22 passing downwardly to the annular space 23 formed between the pressure vessel and the core support barrel. The coolant passes to a space 24 below the core from which it passes through openings in the core support plate and over the various fuel elements of the fuel assemblies 14. The coolant then passes out of the pressure vessel through outlet nozzles not shown.

Horizontal plates 25 closely conform to the outer periphery of the core and are spaced about .25 inch from the outer fuel elements of the outer fuel assemblies. These plates operate to restrict the flow to the core area. A plurality of cylindrical thermal shields 27 surround the core and are slightly spaced therefrom. Each of these shields has a plurality of vertical plates 28 formed in the shape of angles welded to the shield. These plates stiffen the thermal shield. The vertical plates generally conform to the shape of the core but are spaced from the core about ½ inch which is a distance substantially greater than the spacing between the horizontal plates and the core. Any distortion caused by welding can be readily absorbed in the ½ inch tolerance so that welding may be done without concern of distortion.

The upper and lower surface of the thermal shield and the vertical plates are accurately machined (for instance a surface of 125 micro inches). The horizontal plates are sandwiched between respective thermal shields with the portion of the surface of these horizontal plates, which contacts the thermal shield, also being accurately machined. This machining of these surfaces is the only machining required to accurately maintain the overall height of the core shroud structure.

A plurality of generally cylindrical outer thermal shields 30 surround the plurality of cylindrical thermal shields 27. These shields are simultaneously machined top and bottom and have the horizontal plates 25 sandwiched between respective sections. The use of the two sections of thermal shielding instead of one heavy section has the advantage of minimizing thermal distortion of the shield during operation. At the bottom end of the core shroud a machined ring 32 is supplied which is preferably resting on the core support plate, although it could be welded to the core support barrel at that location. This ring provides an upper surface which contacts the inner thermal shield and the vertical plates so as to deter any coolant passing through. The ring 32 extends generally to the core support barrel so as to provide a complete surface for supporting both the inner and outer thermal shields. It, however, has a plurality of openings 33 which allow coolant to downwardly pass this ring.

A plurality of longitudinally extending bolts 34 pass downwardly between the thermal shields, which may have recesses machined to receive the bolt, and are threaded into the machined ring 32. An upper ring 35 covers and seals the upper ends of the thermal shields. Nut 37 is tightened to maintain a compressive force on the stacked array of thermal shields and horizontal plates. The elasticity of this bolt over its substantial length provides some resilience so that the compressive force is resiliently maintained on the stacked array.

Gamma ray absorption in the various thermal shields causes generation of heat which must be removed to avoid undue distortion of the structure. Since it is advantageous to pass all of the coolant through the core itself, means are provided to cool the thermal shields with the coolant before it enters the core. Accordingly the plurality of openings 42 are supplied in the core support barrel at an upper elevation. A portion of the coolant, therefore, follows through these openings to the annular space between the core support barrel and the outer thermal shield 30. A similar plurality of openings 43 are located in an upper portion of the outer thermal shield so that coolant may also flow into the annular space between the inner and outer shields 27 and 30.

If desired an additional plurality of openings 44 may be used in the upper portion of the inner thermal shield to introduce coolant between the plurality of vertical plates 28 and the inner thermal shield 27. This, however, requires an opening for each of these separate channels formed by the vertical plates and also it is desirable to have the plates machined top and bottom for a sealing contact between the vertical plates and the horizontal plates. Without this requirement these plates need not be so accurately machined since their function, stiffening the thermal shield, would be to simply support the horizontal plates and to deter vibration of these plates.

Each of the horizontal support plates 25 has a small hole 45 located in each of the channels formed in the angularly formed vertical plates to permit passage of the coolant fluid downwardly to the lower portion of the thermal shields. A further opening 47 through the lower section of the inner thermal shield may be provided to allow the coolant to flow outwardly from the chambers formed between the vertical plates and the thermal shield. Alternately openings may be provided at the upper edge of ring 32 in appropriate locations to permit egress of the coolant. The coolant passing through all of the annular sections then passes downwardly through opening 33 to a location below the core including passage to opening 48 in the core support plate.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the purview of my invention.

What is claimed is:

1. A flow confining shroud for a nuclear reactor core comprising: a plurality of generally cylindrical thermal shields in stacked array, surrounding the core and slightly spaced therefrom; a plurality of horizontal plates the inner edge of each of which surrounds and closely conforms to the shape of the core, said horizontal plates being sandwiched between respective thermal shields, and said horizontal plates and thermal shields each having accurately machined surfaces at the points of contact therebetween; and means for resiliently maintaining a compressive force on the stacked array of thermal shields and horizontal plates.

2. An apparatus as in claim 1 having also a plurality of vertical plates welded to the inside of each of saiid cylindrical shields, said vertical plates generally conforming to the shape of said core and spaced therefrom a distance greater than said horizontal plates.

3. An apparatus as in claim 2 wherein said vertical plates are accurately machined on the top and bottom edges and are in contact with said horizontal plates.

4. An apparatus as in claim 1 having also a generally cylindrical outer thermal shield surrounding each of said cylindrically thermal shields; said horizontal plates also sandwiched between said outer thermal shields; and said means for resiliently maintaining a compressive force comprising a plurality of longitudinally extending bolts located in the annular space between said outer thermal shields and said thermal shields.

5. An apparatus as in claim 1 having also a pressure vessel; a core barrel surrounding said thermal shields to form an annular space therebetween and supported from said pressure vessel at an upper elevation, said thermal shield array being supported from the lower end of said core barrel; a core support plate supported from the lower end of said core barrel, the reactor core being supported on said core support plate; means for introducing coolant between said pressure vessel and said core barrel at an upper elevation for flow downward to an area below the core; at least one opening in said core barrel at an upper elevation for passage of a portion of the coolant into the annular space between said core barrel and said thermal shield; and a fluid flow path forming a lower portion of the annular space to an area below the core.

6. An apparatus as in claim 4 having also a pressure vessel; a core barrel surrounding said outer thermal shields, forming an annular space therebetween, and supported from said pressure vessel at an upper elevation; a core support plate supported from the lower end of said core barrel, the reactor core being supported on said core support plate; said thermal shield and outer thermal shield array being supported from the lower end of said core barrel; means for introducing coolant between said pressure vessel and said core barrel at an upper elevation for flow downward to an area below the core; said core barrel having at least one opening therethrough at an upper elevation for passage of a portion of the coolant into the annular space between said barrel and said outer thermal shield; and a fluid flow path from a lower portion of the annular space to an area below the core.

7. An apparatus as in claim 4 having also a plurality of vertical plates welded to the inside of each of said cylindrical shields, said vertical plates conforming to the shape of said core and spaced therefrom a distance greater than said horizontal plates.

8. An apparatus as in claim 7 wherein said vertical plates are accurately machined on the top and bottom edges and are in contact with said horizontal plates.

9. An apparatus as in claim 6 having also a plurality of vertical plates welded to the inside of each of said cylindrical shields, said vertical plates conforming to the shape of said core and spaced therefrom a distance greater than said horizontal plates.

10. An apparatus as in claim 9 wherein said vertical plates are accurately machined on the top and bottom edges and are in contact with said horizontal plates.

References Cited

UNITED STATES PATENTS

| | | | |
|---|---|---|---|
| 3,159,550 | 12/1964 | Laming | 176—61 X |
| 3,607,637 | 9/1971 | Marshall | 176—61 |
| 3,212,983 | 10/1965 | Kornbichler | 176—77 |
| 3,179,572 | 4/1965 | Perilhou et al. | 176—77 |
| 3,287,230 | 11/1966 | Jerkins | 176—77 |
| 3,275,521 | 9/1966 | Schuderberg et al. | 176—61 X |

FOREIGN PATENTS

| | | | |
|---|---|---|---|
| 977,537 | 12/1964 | Great Britain | 76—87 |

REUBEN EPSTEIN, Primary Examiner

U.S. Cl. X.R.

171—56, 87